United States Patent [19]

Parker

[11] Patent Number: 4,610,179

[45] Date of Patent: Sep. 9, 1986

[54] MANUAL SHIFT CONTROL LEVER DEVICE AND SELF-CONTAINED ELECTRONIC CONTROL FOR TRANSMISSIONS

[75] Inventor: Francis F. Parker, Santa Ana, Calif.

[73] Assignee: Peter D. Adams, Industry, Calif. ; a part interest

[21] Appl. No.: 648,179

[22] Filed: Sep. 7, 1984

[51] Int. Cl.[4] .............. G05G 9/00; B60K 20/16; H01H 36/00
[52] U.S. Cl. .................. 74/335; 74/473 R; 74/475; 200/61.88; 335/206; 335/207; 338/32 H; 364/424.1
[58] Field of Search .......... 74/335, 473 R, 475, 74/866; 200/61.88, 61.91; 335/206, 207; 338/32 H; 364/424.1

[56] References Cited

U.S. PATENT DOCUMENTS

| | | | |
|---|---|---|---|
| 3,114,020 | 12/1963 | Hall | 335/207 |
| 3,320,562 | 5/1967 | Germanton | 335/207 |
| 3,943,799 | 3/1976 | Sakai et al. | 364/424.1 X |
| 3,961,546 | 6/1976 | Gilmore | 74/866 |
| 4,015,488 | 4/1977 | Akeson et al. | 74/866 |
| 4,022,078 | 5/1977 | Malott | 200/61.88 X |
| 4,033,202 | 7/1977 | Ahlen et al. | 74/866 |
| 4,107,776 | 8/1978 | Beale | 74/866 X |
| 4,137,864 | 2/1979 | Lauper | 116/28.1 |
| 4,203,375 | 5/1980 | Miller | 74/335 |
| 4,338,666 | 7/1982 | Suzuki et al. | 364/424.1 |
| 4,338,832 | 7/1982 | Pelligrino | 364/424.1 X |
| 4,354,236 | 10/1982 | Miki et al. | 364/424.1 |
| 4,487,303 | 12/1984 | Boueri et al. | 364/424.1 X |
| 4,507,736 | 3/1985 | Klatt | 364/424.1 |
| 4,519,266 | 5/1985 | Reinecke | 74/473 R X |

FOREIGN PATENT DOCUMENTS 2703009 7/1978 Fed. Rep. of Germany .... 74/473 R

Primary Examiner—Allan D. Herrmann
Attorney, Agent, or Firm—Whann & McManigal

[57] ABSTRACT

A remote manual shift control device having a manually operable range selector lever for controlling the operation of solenoids, relays and the like of an electrically controlled transmission, in which the selector lever is mechanically coupled to shift a code slide member to positions corresponding to the range positions, and wherein it coacts with switching components to generate binary coded output signals corresponding to the respective range positions as determined by the shift lever. The control device embodies a unitized sealed electronic module containing an IC Decoder Unit for the binary signals with inhibit and latch control terminals; and a connected Logic and Buffers Unit for determining the proper driving connections with the transmission control devices at the transmission. Control for the Decoder Unit and connected Logic and Buffers Unit comprises a NAND gate having inputs for the respective binary coded signals, and an output for a control signal having positive and negative edges for respectively triggering a long time interval monostable multivibrator and a short time interval monostable multivibrator providing a time delay energizable connection to the latch terminal of the Decoder Unit; and a flip-flop having input actuating reset and actuating control connections respectively with the short time interval monostable multivibrator and a high current sensor of an abnormal current condition in a driving connection of a transmission control device, and an energizing output control connection with the inhibit terminal of the Decoder Unit.

25 Claims, 8 Drawing Figures

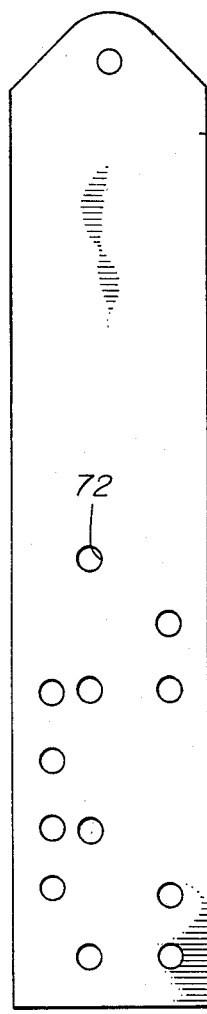
FIG. 5
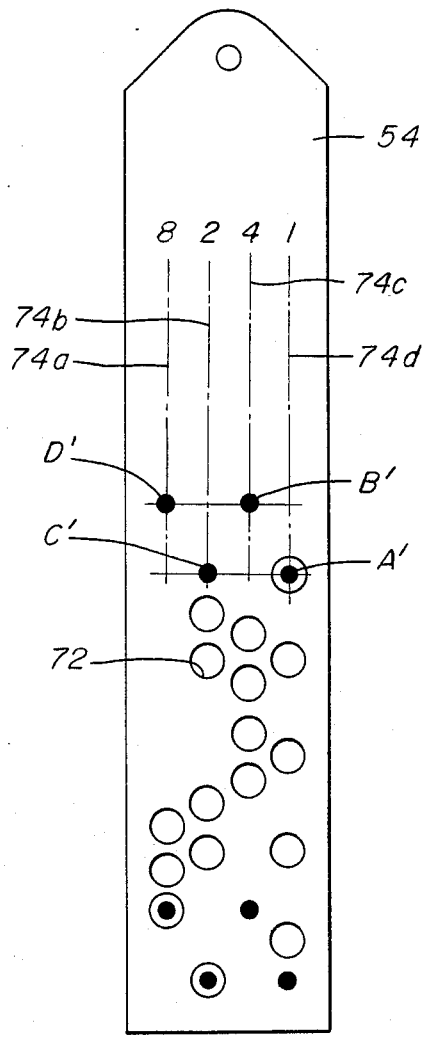
FIG. 6
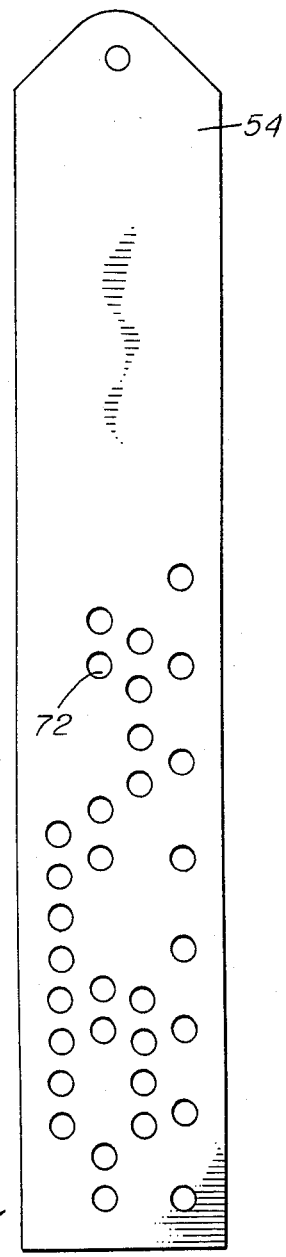
FIG. 7
| ACTIVATED SENSOR | TRUTH TABLE |  |  |  |  |  |  |  |  |  |  |  |  |  |  |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| A | 1 | 0 | 1 | 0 | 1 | 0 | 1 | 0 | 1 | 0 | 1 | 0 | 1 | 0 | 1 |
| B | 0 | 0 | 0 | 1 | 1 | 1 | 1 | 0 | 0 | 0 | 0 | 1 | 1 | 1 | 1 |
| C | 0 | 1 | 1 | 0 | 0 | 1 | 1 | 0 | 0 | 1 | 1 | 0 | 0 | 1 | 1 |
| D | 0 | 0 | 0 | 0 | 0 | 0 | 0 | 1 | 1 | 1 | 1 | 1 | 1 | 1 | 1 |
CONTROL LEVER POSITION
FIG. 8

MANUAL SHIFT CONTROL LEVER DEVICE AND SELF-CONTAINED ELECTRONIC CONTROL FOR TRANSMISSIONS

PRIOR ART

In the prior art there are a number of disclosed arrangements for remotely controlling change-speed transmissions electronically by means of coded signals from a manually operable shift control lever device. The closest art known to applicant are the following patents:

U.S. Pat. No. 3,961,546—June 8, 1976
U.S. Pat. No. 4,015,488—Apr. 5, 1977
U.S. Pat. No. 4,033,202—July 5, 1977
U.S. Pat. No. 4,107,776—Aug. 15, 1978
U.S. Pat. No. 4,338,666—July 6, 1982
U.S. Pat. No. 4,354,236—Oct. 12, 1982

BACKGROUND OF THE INVENTION

The present invention relates generally to the control of electrically variable transmissions in accordance with code signals determined by the actuation of a remote manually operable range selector lever, and is more particularly concerned with the character of the signal and the manner in which it is generated.

Basically, the transmission control arrangements for remotely controlling the transmissions have been quite complex and predicated upon the use of digitally coded electrical signals or upon the more advantageous use of binary coded signals connected with decoder means and logic circuitry to provide the appropriate combination of driver controlled circuits for the controlling devices of the transmission.

The prior art concept of utilizing digital electronic control signals is exemplified by U.S. Pat. No. 4,015,488 in which a digital electronic controller provides output signals to operate the solenoids of the clutch valves of a lockup type torque converter.

It has also been generally known from the prior art as exemplified by U.S. Pat. No. 3,961,546 to utilize digitally coded electrical signals from a manual gear selector for either directly automatically shifting a transmission or by electronically converting the initially generated digital signals into binary coded output signals which are fed to a shift logic counter and decoder to control the operation of the transmission.

According to the present invention, it is proposed to provide a remote control for electrically controllable transmissions, which utilizes the advantages of binary control signals, but avoids the disadvantages and complexity of utilizing electronically generated binary control signals.

For such purpose, there is provided a manual shift control lever device of the character generally disclosed in U.S. Pat. No. 4,137,864, but in which the range selector shift lever is mechanically coupled with the operates to shift a code slide member to a desired operating range position of the transmission. The code slide member is conformed and arranged to actuate associated switching components in binary signal forming combinations corresponding to each position of the range shift lever. The control lever device is further integrated as a unitized embodiment by containing the control circuitry in a sealed housing portion and includes a decoder for the mechanically generated binary signals and connected shift logic means having output connections with a plug connector which facilitates and simplifies the connection of the control circuits to the controlling devices of the transmission.

An important feature of the present invention is that the code slide provides a new and unique concept whereby a control shift lever device can be easily and inexpensively changed to provide shift lever devices respectively having a total number of different shift positions, for example, seven, ten, and fifteen positions.

SUMMARY OF THE INVENTION

The present invention provides a unique unitized manually operable range shift remote control lever unit for electrically controlled transmissions, and embodies means for mechanically producing binary control signals, and an associated electronic module containing decoder and shift logic control means for energizing the electric controlling devices of a variable transmission.

It is one object of the herein described invention to provide an improved and unique manually operable range shift remote control device for electrically controlled transmissions, which can be quickly and relatively inexpensively modified to provide compatible control means in shift levers relatively having a different total number of shift positions, for example, seven, ten, and fifteen positions.

A further object is to provide a manual shift control lever device for electrically controlled transmissions, and which embodies means for mechanically generating binary control signals corresponding to the selective operative positions of the shift control lever.

Another object resides in the provision of a self-contained shift control lever device for changing the operative condition of an electrically controlled transmission, which includes switching components controlled by a code slide connected for movement by the control lever, the code slide being arranged to activate the switching components into binary signal forming combinations corresponding to the respective positions of the range shift lever.

Still another object is to provide a unitary self-contained shift control lever device for mechanically producing binary signals corresponding to the respective operating range positions of the control lever, and which embodies connected control means for controlling a connected electrically controlled transmission in accordance with position changes of the shift control lever, and in which the control means comprises means for decoding the binary signals, and connected logic and buffer means operable to energize controlling devices of the transmission in proper sequence to effect operation of electrically energizable control devices for changing the transmission as determined by the position of the range selector lever, and control circuit generating means including gating means connected to receive the binary signals and provide control outlet signals for activating the decoding means in response to high and low pulses from a timing means, and reset a flip-flop responsive to a high current condition in a transmission control device to inhibit operation of the decoding means so as to disconnect the faulty transmission control device.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

FIGS. 5, 6 and 7 are elevational side views of code slide structures for the shift control lever unit, and respectively indicating the patterns of openings therein for obtaining and producing appropriate binary control signals for control lever units having 7, 10 and 15 range control positions; and FIG. 8 is a truth table showing the activated binary signal forming sensors for each range position of the shift lever.

DESCRIPTION OF A PREFERRED EMBODIMENT

Referring more specifically to the drawings, for illustrative purposes, the invention is shown as comprising generally a shift control lever unit, generally indicated by the numeral 10, and basically being of a type similar to that disclosed in U.S. Pat. No. 4,137,864, which is included herein by reference, but has been modified and improved to include a mechanical encoder 12 and an associated sealed electronic module 14 containing suitable potted circuitry and components providing a unitized manually operable remote control for the electrically energizable control devices of a variable range transmission.

Figure 2:
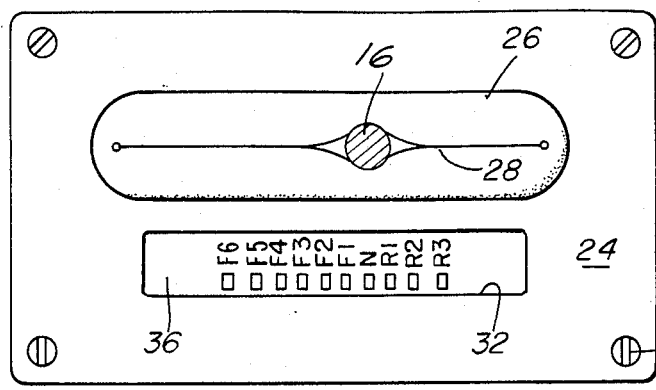
FIG. 2 is s top plan view, partly in section, of the shift control lever unit, and showing its respective range positions.
Figure 3:
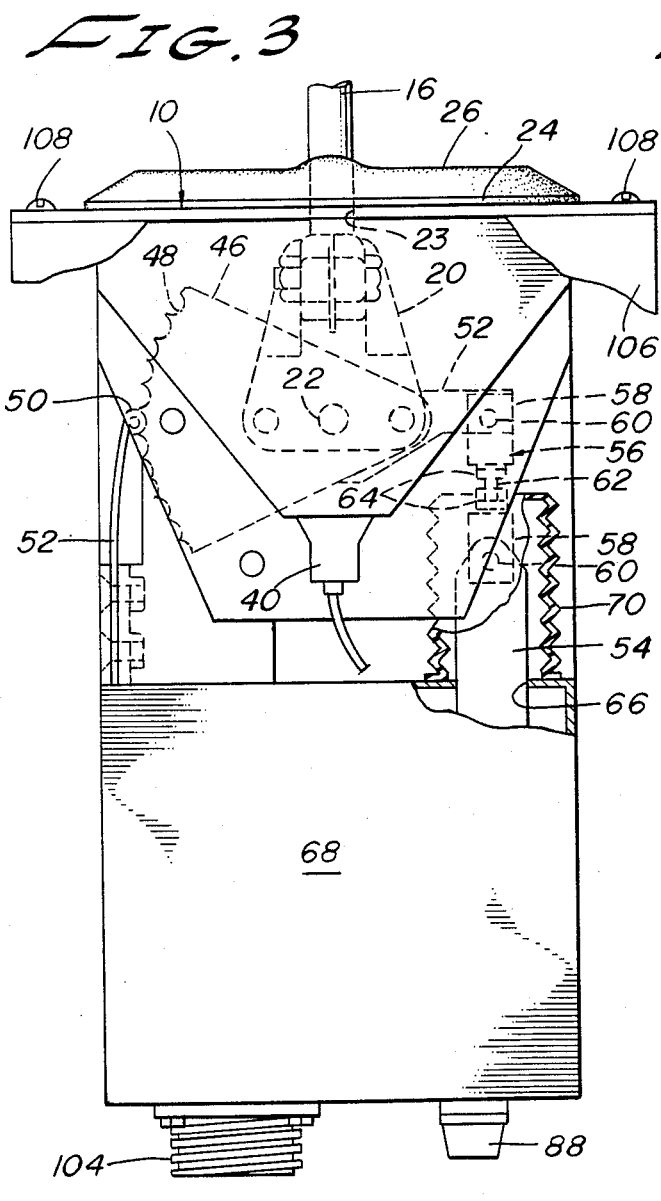
FIG. 3 is a side elevational view of the shift control lever unit, portions of the housing being cut away to disclose the operative interconnection between the control lever and a code slide.
Figure 4:
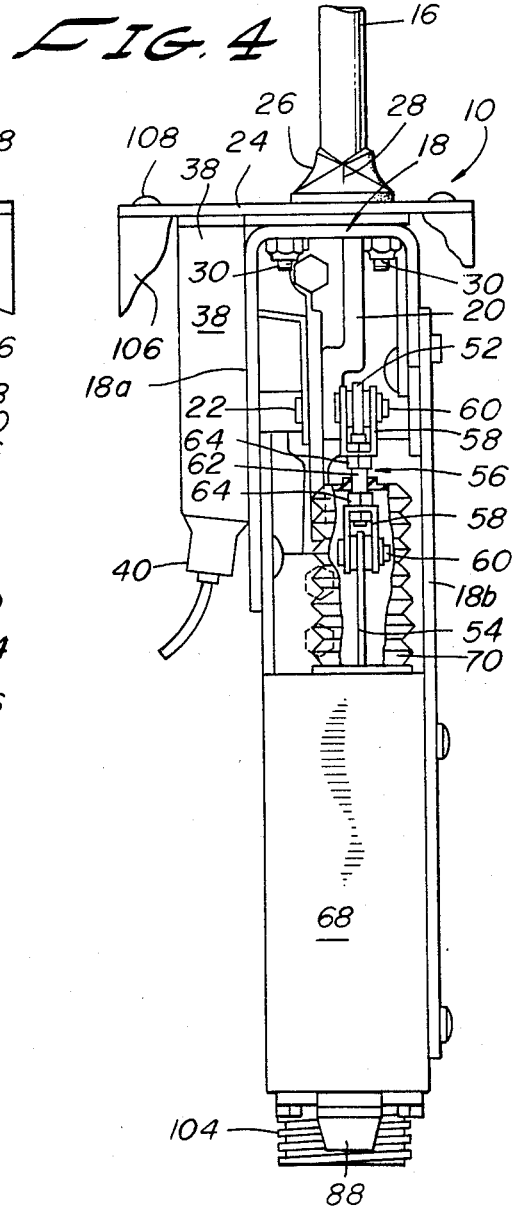
FIG. 4 is an edge elevational view, with portions in section and other portions cut away to disclose further details of the connections with the code slide.

Referring more specifically to FIGS. 2, 3 and 4, the shift control lever unit 10 is illustrated as comprising a shift lever 16 which is mounted on a U-shaped main frame structure 18 having spaced apart wall portions 18a and 18b. The shift lever at its inner end is swingably supported on the wall portion 18a by means of an attached supporting hub member 20 engaged with a pivot pin 22.

The lever 16 extends outwardly through an elongate slot 23 formed in a top plate member 24 and along which the shift lever is movable as it is shifted from one range position to another. Preferably, the shift lever is sealed with respect to the slot 23 by means of an appropriate overlying seal member 26 of flexible material containing a longitudinally extending slit 28, the edges of which are adapted to sealingly engage the shift lever as it is moved along the slot 23. As indicated in FIGS. 3 and 4, the top plate 24 extends outwardly beyond the U-shaped frame structure 18 and is mountingly secured thereto by means of appropriate mounting bolts 30.

As shown in FIG. 2, the top plate member 24 is also formed to provide an elongated window opening 32 which extends in generally parallel relation to the slot 23, this window being provided with an insert strip 36 of suitable plastic or other light transmitting material, and upon which appropriate indicia are placed to indicate the respective range positions of the lever 16. The actual position of the shift lever 16 is indicated by means of a movable light beam arrangement similar to that disclosed in the previously mentioned U.S. Pat. No. 4,137,864, which is contained in a cover 38 housing and includes a connected light source 40.

The shift lever 16 at its outermost end mounts a T-shaped handle 42 which is provided with a spring-loaded button 44 that is operatively connected with means, not shown, for independently locking the shift lever in a neutral position, but which upon being depressed will release the shift lever for movement to another range position. The pivotally mounted hub member 20, as best shown in FIG. 3, carries a sector shaped member 46 which is swingable with the shift lever 16 about the axis of pivot pin 22 and is provided on its arcuate periphery with recesses 48 which provide dwell positions for a rotatably mounted roller 50 at the outermost end of a leaf spring 52 for releasably retaining the shift lever 16 in a selected range shift position, when moved from the neutral position.

As shown in FIGS. 3 and 4, the hub member 20 carries an actuating lever 52 which is coupled with a code slide member 54 of the mechanical encoder 12 by means of a motion transmitting link 56 having end clevices 58, 58 which are pivotally connected by pivot pins 60 respectively with the lever 52 and the code slide member 54. In order to provide for relative longitudinal adjustment of the fixed position of the code slide member 54, the end clevices 58, 58 are interconnected by a threaded connecting rod 62 and secured by associated lock nuts 64. As will be seen, the code slide member 54 operatively extends through a wall slot 66 into a sealed housing 68 containing the components of the mechanical encoder 12 and the electronic module 14. A bellows type boot 70 is mounted over the connected end of the code slide member 54 to seal it and the slot 66 against the entrance of environmental dust or debris into the housing 68.

Figure 1:
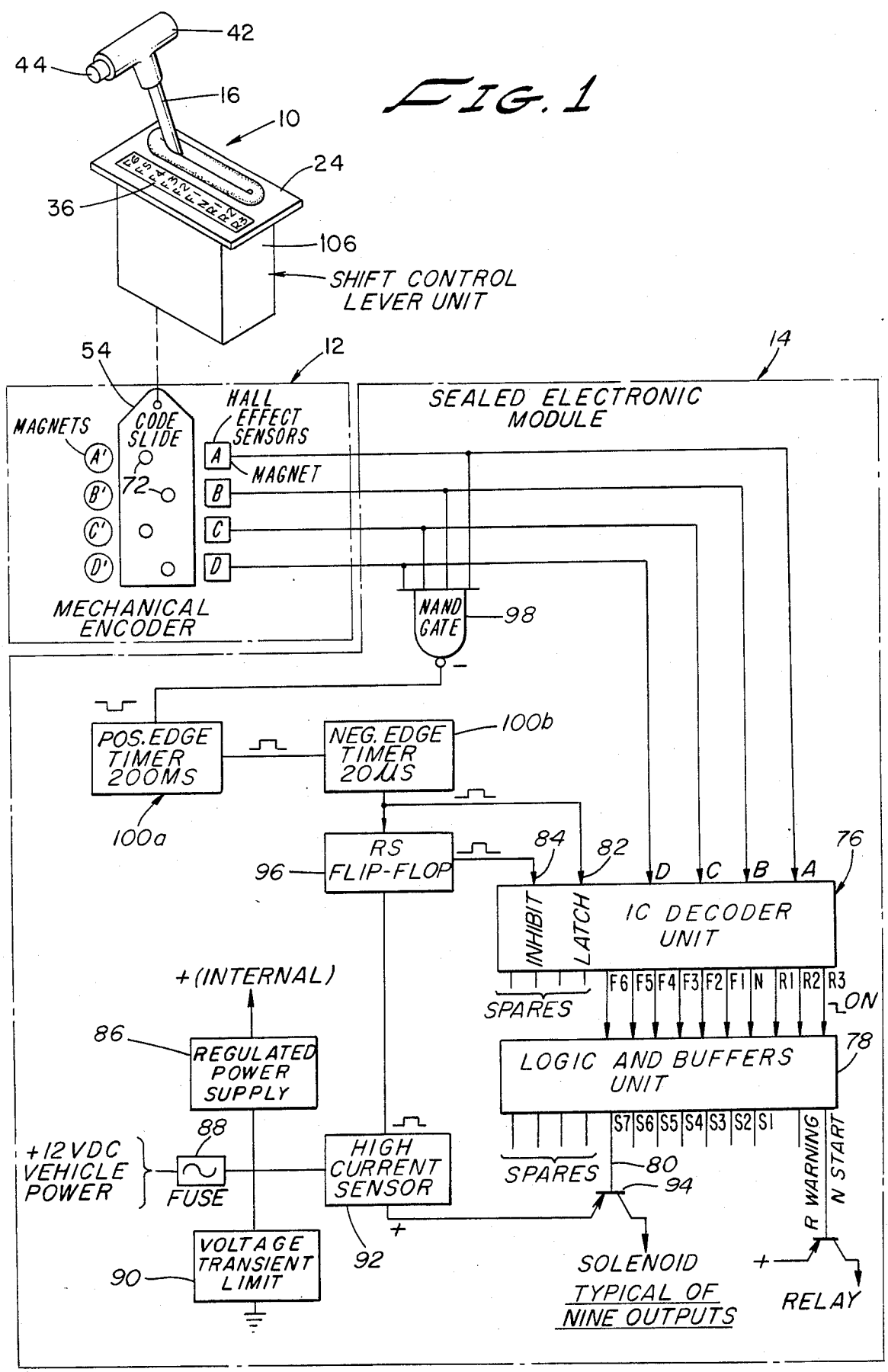
FIG. 1 is a view schematically illustrating the shift control lever unit of the invention and the interconnection of its control lever with an included mechanical encoder, and schematic circuitry as contained in a sealed electronic module therein.

As schematically illustrated in FIG. 1, the code slide 54 is supported for sliding movement between permanent magnets A', B', C' and D' and magnetically responsive switching elements as indicated at A, B, C, D, the code slide being provided with openings 72 which serve to modulate the operation of the switching elements and generate binary control signals corresponding to each position of the shift lever 16, in a manner which will hereafter be more fully explained in detail. In the present invention, these switching elements preferably comprise commercially available Hall effect sensors which have an operating characteristic such that upon being subjected to magnetic radiations, its output will be low, and conversely when the magnetic radiations are interrupted the output voltage will be high.

The code slide member 54 constitutes an important feature of the present invention in that it provides a concept whereby, as respectively shown in FIGS. 5, 6 and 7, the code slides can be fabricated with appropriate different pattern arrangements of the openings and thus provide output binary control signals for shift control lever units respectively having seven shift positions as shown in FIG. 5, ten shift positions as shown in FIG. 6, and fifteen shift positions as shown in FIG. 7. More specifically, as exemplified by the arrangement shown in FIG. 6, the openings 72 are relatively positioned along four laterally spaced locus lines 74a, 74b, 74c, and 74d representing four bit digital values respectively of 8, 2, 4, and 1. The magnets A', B', C', and D' are permanently fixed in a trapezoidal group orientation, as indicated, so that as the code slide member is moved longitudinally, the magnet A' will be relatively aligned or disaligned with the openings 72 lying on the locus line 74d, the magnet B' relatively aligned or disaligned with openings 72 on locus line 74c, the magnet C' relatively aligned or disaligned with the openings on locus line 74b and magnet D' relatively aligned or disaligned with openings 72 on locus line 74a, in a manner to thus activate the sensors A, B, C, and D to produce high and low voltage binary output signals at each control lever position, as shown in the truth table, FIG. 8. It is important to note also that in shifting the shift lever 16 from one position to another, the radiations from the respective magnets to the sensors will be interrupted, whereupon they will all have high voltage outputs. Advantage is taken of this inherent operating condition in connection with the operation of the control for shifting the associated transmission, as will hereinafter be described in further detail.

The electronic module 14, as shown in FIG. 1, includes the components for properly shifting the transmission in accordance with the binary signals as generated in the selected shift positions of the shift lever 16. The disclosed primary control is such that it may be easily and effectively interfaced and combined with auxiliary control circuitry, not shown, for comparing actual operating conditions, such as ground speed, torque converter output and/or other engine conditions, with desired operating conditions as determined by the shift lever 16.

More specifically, the transmission control according to the present invention is illustrated as comprising a decoder unit 76 which is connected to receive the binary output signals A, B, C, and D from the mechanical encoder 12 and deliver the decoded signals to a connected logic and buffers unit 78 providing the appropriate combination of driver control circuits 80 (S1-S7 etc.) that are respectively connected with the controlling devices such as solenoids, relays or the like for shifting the transmission.

The decoding unit includes a terminal 82 for a latch control operable, when supplied with a relatively high signal pulse, to activate the decoding unit so as to receive the decode the coded binary signals; and upon receipt of a relatively low signal pulse, to provide memory storage for such decoded signals. A terminal 84 is also provided for inhibit control which is operable upon receipt of a relatively low signal pulse to activate the decoder unit so as to permit normal operation, but upon receipt of a relatively high signal pulse will operate to de-energize all of the output circuits 80.

Provision is made in the electronic module 14 for providing an appropriate electric supply for the electronic components from a regulated power supply 86 which has its input connected through a fuse 88 to a conventional 12 volt direct current power source such as is normally available on an engine driven vehicle. As shown, the fused 12 volt power source is also connected with a voltage transient limit means 90 and a high current sensor 92 which is connected with the emitter terminal of a driver transistor 94 in each of the output circuits 80. As thus arranged, upon the occurrence of a high current condition in an output circuit 80, due to faulty operation of the solenoid, relay or other electric control device at the transmission, the high current sensor 92 will operate through a connected flip-flop 96 to energize the inhibit control terminal 84 and cause the decoder unit to disconnect the faulty transmission output circuit 80.

Control circuit means for the decoder unit 76 includes a NAND gate 98 having its inputs respectively connected to receive the binary output signals A, B, C and D from the mechanical encoder 12. Timing means are connected with the output of the NAND gate and are operable to supply operating control latching pulses to the latch terminal 82 of the decoder unit 76. For such purpose, the timing means are shown as comprising a first timer 100a in the form of a monostable multivibrator having a relatively long timing period of 200 milliseconds and being triggered by the positive edge of an output signal from the NAND gate. The timing means also includes a second timer 100b in the form of a monostable multivibrator having a relatively short timing period of 20 microseconds and being triggered by the negative edge of the output signal from the NAND gate. Operation of the first timer 100a is advantageous for the reason that it provides a relatively long time interval delay permitting the mechanical encoder slide 54 and its mechanical operating connection to reach a stabilized static position and prevent the transmission from adopting an intermediate range when a non-adjacent range position is selected by the shift lever 16. The second timer 100b is connected with a flip-flop 96 and thus serves to reset the flip-flop in the event that it has been previously actuated by the high current sensor.

As previously stated, when the shift lever 16 is moved from one position to another, the binary signals A, B, C and D will all be high, and cause the output of the NAND gate to produce a low signal which will interrupt any prior timing operation initiated by the first timer 100a. However, as soon as the code slide 54 moves to a new range position, the output of the NAND gate will go high and again operate to trigger the first timer 100a and provide a new timing delay interval for the new range position.

Connection of the output circuits 80 with the control devices of the transmission is facilitated by the provision of a multiconductor plug connector receptacle 104 mounted on the sealed housing 68. Preferably, the actuating mechanism of the shift control lever unit, the cover 38 and the sealed housing 68 are further protected by a further main housing 106 which is shown in FIG. 3 as being attached at its upper end to the top plate member 24 as by securing screws 108.

From the foregoing description and drawings, it will be clearly evident that the delineated objects and features of the present invention will be accomplished.

Various modifications may suggest themselves to those skilled in the art without departing from the spirit of my invention, and, hence, I do not wish to be restricted to the specific form or forms shown or uses mentioned, except to the extent indicated in the appended claims.

I claim:
1. A unitized shift control lever device for the remote activation of an electrically controlled transmission comprising:
a housing;
a manually operable range selector lever pivotally supported in said housing for selective movements to predetermined operating positions respectively indicative of a required operating condition of an associated electrically controlled transmission;
means in said housing providing a source of radiations;

radiation controlled switching means for generating discrete control signals in response to the presence and non-presence of said radiations;

means interposed in the radiation path between said source and said switching means operable in response to the movement of said range selector lever for selectively determining the presence or non-presence of said radiations with respect to said switching means at each range selector position of said lever; and electronic circuit control means having input connections for receiving said generated signals and output connections adapted for connection with electrically activated condition controlling devices on the transmission.

2. A control device according to claim 1, in which:
the generated control signals are coded binary signals; and
the electronic circuit control means includes means for decoding the coded binary signals into digital output signals supplied to separate output terminals corresponding to the range selector lever positions.

3. A control device according to claim 2, which includes:
logic and buffer means having input connections for receiving the output signals of the decoding means and output connections respectively with the electrically activated controlling devices at said transmission, and being operable to drive said devices in proper sequence to effect operation of the transmission as determined by the position of said range selector lever.

4. A remote shift control lever device for an electrically controlled transmission, comprising:
a housing;
a manually operable range selector lever pivotally supported in said housing for selective movements to predetermined operating positions respectively indicative of a required operating conditon of an associated electrically controlled transmission;
a plurality of separate switching components in said housing, each having a normal operating mode and being operable from one operating mode to another operating mode in accordance with the presence and non-presence of radiations from an associated radiation source in the housing;
a radiation modulating element in the housing positioned for movement between the respective radiation sources and the associated switching components in response to the selective movements of said selector lever, and at each selected shift lever position determine the presence and non-presence of the radiations with respect to each of the associated switching components and thereby change the operating mode of one or more of said switching components and generate predetermined switched discrete control signals; and
electronic circuit control means having input connections for receiving said generated control signals, and output connections for connection with electrically activated condition controlling devices on the transmission.

5. A control device according to claim 4, in which:
the sources of the radiations comprise a predetermined pattern of permanent magnets;
the modulating element comprises a flat member of a magnetic radiation shielding material having a prearranged pattern of spaced openings enabling the passage of radiations from the magnets to the associated switching components.

6. A control device according to claim 5, in which:
the switching components comprise Hall effect sensors.

7. A control device according to claim 4, in which:
said modulating element operates to control said radiations with respect to the switching components in a manner such that the switching components will operate to produce binary output signals.

8. A control device according to claim 7, in which:
the radiations are magnetic radiations;
the modulating element comprises a panel member coupled with said selector lever and being movable in opposite directions thereby; and
in which said panel is fabricated with a series of radiation transmitting openings relatively positioned along four laterally spaced locus lines representing digit values having the lateral relationship 8, 2, 4 and 1.

9. A control device according to claim 8, in which:
the modulating element comprises an elongate strip which is moved rectilinearly in opposite directions by said selector lever.

10. A unitized shift control lever device for the remote activation of an electrically controlled transmission, comprising:
a housing:
a manually operable range selector lever pivotally supported in said housing for selective movements to predetermined operating positions respectively indicative of a required operating condition of an associated electrically controlled transmission;
means in said housing responsive to the movement of said range selector lever to said predetermined operating positions for generating discrete control signals respectively corresponding to such selective operating positions;
electronic circuit control means having input connections for receiving said generated signals, and output connections adapted for connection with electrically activated condition controlling devices on the transmission, and wherein said electronic circuit control means and said means for generating a discrete control signal are contained within a secondary housing having a wall with a slot opening therein, and includes an elongate modulating strip longitudinally movable in said slot opening with one end being positioned within the secondary housing and its other end being positioned exteriorly of the secondary housing and operatively coupled with said range selector lever; and
a protective flexible boot surrounds and seals the other end of the modulating strip and said slot opening.

11. A control device according to claim 10, in which:
detent means releasably holds the selector lever and the connected modulating strip at each selected operating range position for generating the corresponding control signal for such selected range position.

12. A control device according to claim 11, in which:
the output connections of said electronic circuit control terminate in a plug type connector mounted to a wall of said secondary housing.

13. A unitized shift control lever device for the remote activation of an electrically controlled transmission, comprising:

a housing;

a manually operable range selector lever pivotally supported in said housing for selective movements to predetermined operating positions respectively indicative of a required operating condition of an associated electrically controlled transmission;

means in said housing responsive to the movement of said range selector lever to said predetermined operating positions for generating discrete control coded binary signals respectively corresponding to such selective operating positions;

electronic circuit control means having input connections for receiving said generating signals, and output connections adapted for connection with electrically activated condition controlling devices on the transmission, and means for decoding the coded binary signals into digital output signals supplied to separate output terminals corresponding to the range selector lever positions, said decoding means comprising:

latch means energizable by a relatively high signal pulse to activate the decoding means to receive and decode the coded binary signals, and upon receipt of a relatively low signal pulse to provide memory storage for such decoded signals; and inhibit means energizable upon receipt of a relatively low signal pulse to permit normal operation of the decoder means, and which, upon receipt of a relatively high signal pulse, is operative to de-energize all energized condition controlling devices on the transmission; and control circuit means connected with said latch means and said inhibit means including a NAND gate having its input connected to receive said binary signals.

14. A control device according to claim 13, comprising:
timing means connected with the output of said NAND gate for supplying a latching pulse to said latch means.

15. A control device according to claim 14, in which: said timing means includes:
a first timer monostable multivibrator having a relatively long timing period and being triggered by the positive edge of an output signal from said NAND gate; and
a second timer monostable multivibrator having a relatively short timing period and being triggered by the negative edge of the output signal received from said NAND gate.

16. A control device according to claim 15, in which: said timers are triggered in response to transitional movements of said range selector lever from one range position to another.

17. A control device according to claim 15, comprising:
a high current sensor for detecting an abnormal current condition in each of said output connections with the transmission control devices; and
flip-flop means having input actuating reset and actuating set control connections respectively with said second timer and said high current sensor, and an output connection to actuate said inhibit means and disconnect the output connections to the transmission control devices.

18. A unitized shift control lever device for the remote activation of an electrically controlled transmission, comprising:

a housing;

a manually operable range selector lever pivotally supported in said housing for selective movements to predetermined operating positions respectively indicative of a required operating condition of an associated electrically controlled transmission;

means in said housing responsive to the movement of said range selector lever to said predetermined operating positions for generating discrete control signals respectively corresponding to such selective operating positions, which includes:

a plurality of separate radiation operable switching components, each having a normal operating mode;

a plurality of fixed radiation sources respectively operably associated with each of said switching components;

a modulating element responsive to the selective movements of said selector lever for changing the radiations from said radiation sources with respect to said switching components to vary the operating mode of one or more of said switching components and generate predetermined switching control signals; and electronic circuit control means having input connections for receiving said generated signals, and output connections adapted for connection with electrically adtivated condition controlling devices on the transmission.

19. A control device according to claim 18, in which: said modulating element and switching components coact to produce binary output signals.

20. A control device according to claim 19, in which: said range selector lever and said modulating element are cooperatively structured to selectively produce discrete binary output signals corresponding to and including a predetermined maximum number of range positions.

21. A control device according to claim 20, in which: said maximum number of range positions is three.

22. A control device according to claim 20, in which: said maximum number of range positions is seven.

23. A control device according to claim 21, in which: said maximum number of range positions is ten.

24. A control device according to claim 20, in which: said maximum number of range positions is fifteen.

25. A unitized shift control lever device for the remote activation of an electrically controlled transmission, comprising:

a housing;

a manually operable range selector lever pivotally supported in said housing for selective movements to predetermined operating positions respectively indicative of a required operating condition of an associated electrically controlled transmission;

means in said housing responsive to the movement of said range selector lever to said predetermined operating positions for generating discrete coded binary control signals respectively corresponding to such selective operating positions; and electronic circuit control means having input connections for receiving said generated signals, and output connections adapted for connection with electrically activated condition controlling devices on the transmission, which includes:

means for decoding the coded binary signals into digital output signals supplied to separate output terminals corresponding to the range selector lever positions;

logic and buffer means having input connections for receiving the output signals of the decoding means and output connections respectively with the electrically activated controlling devices at said transmission, and being operaable to drive said devices in proper sequence to effect operation of the transmission as determined by the position of said range selector lever;

means connecting each of said output connections of said logic and buffer means with a power supply circuit; and means including high current sensor means for disconnecting an output connection of said logic and buffer means and the connected transmission controlling device upon the occurrence of a predetermined high current condition therein.

* * * * *